US010285340B2

(12) United States Patent
Manning et al.

(10) Patent No.: US 10,285,340 B2
(45) Date of Patent: May 14, 2019

(54) GEOTEXTILE-BASED STRUCTURE FOR VEGETATIVE GROWTH ENHANCEMENT AND EROSION RESISTANCE

(71) Applicant: Propex Operating Company, LLC, Chattanooga, TN (US)

(72) Inventors: D. Scott Manning, Chattanooga, TN (US); R. Lee Pierce, Chattanooga, TN (US)

(73) Assignee: Propex Operating Company, LLC, Chattanooga, TN (US)

( * ) Notice: Subject to any disclaimer, the term of this patent is extended or adjusted under 35 U.S.C. 154(b) by 0 days.

(21) Appl. No.: 15/902,322

(22) Filed: Feb. 22, 2018

(65) Prior Publication Data

US 2019/0075738 A1 Mar. 14, 2019

Related U.S. Application Data

(60) Provisional application No. 62/558,205, filed on Sep. 13, 2017.

(51) Int. Cl.
| | | |
|---|---|---|
| *E02D 29/02* | (2006.01) | |
| *A01G 24/44* | (2018.01) | |
| *E02D 17/20* | (2006.01) | |
| *A01G 24/50* | (2018.01) | |
| *A01G 20/20* | (2018.01) | |
| *A01G 25/00* | (2006.01) | |

(52) U.S. Cl.
CPC .............. *A01G 24/44* (2018.02); *A01G 20/20* (2018.02); *A01G 24/50* (2018.02); *E02D 17/202* (2013.01); *A01G 25/00* (2013.01)

(58) Field of Classification Search
CPC ......... A01G 20/20; E02B 3/12; E02D 17/202; E02D 29/0208
See application file for complete search history.

(56) References Cited

U.S. PATENT DOCUMENTS

| | | |
|---|---|---|
| 2,121,173 A | 6/1938 | MacPherson |
| 4,655,637 A | 4/1987 | Vignocchi |
| 5,333,970 A | 8/1994 | Heselden |
| 5,368,410 A | 11/1994 | Ferraiolo |
| 5,616,399 A | 4/1997 | Theisen |
| 5,677,016 A | 10/1997 | Ferraiolo |
| 6,857,817 B2 | 2/2005 | Rothfuss |

(Continued)

FOREIGN PATENT DOCUMENTS

| | | |
|---|---|---|
| CN | 205894023 U | 1/2017 |
| GB | 2332353 A | 6/1999 |

(Continued)

OTHER PUBLICATIONS

Notice of Allowance re Canadian Application No. CA 2,996,193, dated May 4, 2018.

(Continued)

*Primary Examiner* — Sean D Andrish
(74) *Attorney, Agent, or Firm* — Husch Blackwell LLP (57) ABSTRACT

This application discloses a geotextile-based structure for soil stabilization, erosion control, and vegetation-growth enhancement that is made from a cage having a hollow interior lined with a geotextile fabric designed to retain fine materials, which cage is attached to a geotextile mat capable of supporting vegetation.

20 Claims, 5 Drawing Sheets

(56) References Cited

U.S. PATENT DOCUMENTS

| | | |
|---|---|---|
| 7,425,107 B2 * | 9/2008 | Derache .................. E01F 7/045 405/262 |
| 7,717,643 B2 | 5/2010 | Han |
| 8,251,610 B2 | 8/2012 | Heselden |
| 8,262,318 B2 | 9/2012 | Olsta et al. |
| 9,481,970 B2 | 11/2016 | Gabion |
| 2003/0022134 A1 | 1/2003 | Seniuk |
| 2005/0287343 A1 | 12/2005 | Weiser |
| 2009/0185871 A1 | 7/2009 | Heselden |
| 2010/0024343 A1 * | 2/2010 | Eggermont ........... E02D 17/202 52/648.1 |
| 2015/0086279 A1 | 3/2015 | Cooley et al. |
| 2017/0107131 A1 | 4/2017 | Li et al. |

FOREIGN PATENT DOCUMENTS

| | | |
|---|---|---|
| JP | 2011122403 A | 6/2011 |
| KR | 100874956 B1 | 12/2008 |
| KR | 20100136795 A | 12/2010 |
| KR | 101246268 B1 | 3/2013 |
| KR | 101337411 B1 | 12/2013 |
| KR | 101525404 B1 | 6/2015 |
| KR | 20160103915 A | 9/2016 |
| KR | 101704458 B1 | 2/2017 |

OTHER PUBLICATIONS

Examination Report No. 1, re Australian Patent Application No. AU 2018201278, dated Apr. 13, 2018.

* cited by examiner

GEOTEXTILE-BASED STRUCTURE FOR VEGETATIVE GROWTH ENHANCEMENT AND EROSION RESISTANCE

CROSS-REFERENCE TO RELATED APPLICATIONS

This application claims the priority benefit of the U.S. Provisional Patent Application Ser. No. 62/558,205, filed Sep. 13, 2017, whose disclosures are incorporated herein by reference.

TECHNICAL FIELD

This application is directed to a geotextile-based structure for the stabilization of soil. Specifically, this application relates to a cage supporting a three-dimensional geotextile mat that enhances the growth of vegetation and reduces the erosion of soil.

BACKGROUND

Soil erosion is a significant, world-wide environmental challenge for which there are relatively few good solutions. After thousands of years, the problem of erosion still exists because most known methods and devices to prevent soil erosion cannot withstand the natural elements over time, are too costly to implement, are too cumbersome to use, and are basically ineffective.

In the past, attempts to prevent soil erosion have included placing natural elements, such as wood, soil, sand, and stones in the area to be stabilized. While these materials can usually be found in abundance, being natural products, they cannot withstand the test of time and are degraded quickly, except for very large boulders, which are difficult to find, transport, and maneuver, and can be quite costly to purchase in bulk.

Other attempts to prevent soil erosion have included the use of man-made materials, such as plastic fences and cement walls. While some of these devices have been moderately successful, they have suffered from problems also, such as degradation from sunlight, extreme temperatures, water, and wind. They also are not esthetically pleasing to the eye, being made of artificial materials and, as such, do not facilitate or support plant growth. Thus, there exists a need for an effective solution to the problem of soil erosion, which the present application addresses.

BRIEF SUMMARY

The present application is directed to a geotextile-based structure for soil stabilization made from a cage having a hollow interior lined with a geotextile fabric designed to retain fine particles where the cage is attached to a geotextile mat capable of supporting vegetation.

One embodiment includes a geotextile-based structure for soil stabilization made from a metallic cage having a hollow interior lined with a geotextile fabric designed to retain fine particles, where the cage has an open top side and a closed bottom side attached to four upright sides. In this structure, one upright side of the cage and the open top side of the cage are attached to and covered by a geotextile mat capable of supporting vegetation. The geotextile mat has a three-dimensional, cuspated profile and is woven from a trilobal thermoplastic filament yarn. A vegetative-sustaining material lies within a pocket formed between the geotextile mat and at least one side of the cage.

The geotextile-based structure of this application has several benefits and advantages. One particular benefit is that the disclosed structure reduces the amount of soil erosion and rate of soil erosion. Another benefit is that the geotextile-based structure has substantial durability by incorporating a geotextile mat having significant tensile strength and tear strength as well as high UV light stability, as compared to other erosion-control structures. This substantial durability provides long-term, erosion control protection, usually many decades, without the necessity of periodic replacement. Yet another benefit is that the geotextile-based structure is better able to withstand, absorb, and dissipate the powerful hydrostatic and wave forces caused by oceans, lakes, rivers, and ground-waters to protect shorelines. A further benefit is the reduction of sheer force and rate of water flow due to contact with the three-dimensional, cuspated surface of the geotextile-based structure. Still another benefit is that the geotextile-based structure promotes seed germination, boosts average plant height, and increases plant mass per area due to the lofty, three-dimensional web of the geotextile mat, which mechanically supports the newly seeded vegetation as it grows on top of, into, and through the mat.

BRIEF DESCRIPTION OF THE DRAWINGS

FIG. 1 illustrates one exemplary geotextile-based structure. A: plan view. B: isometric view. C: elevation view. D: side view.

FIG. 4 illustrates one exemplary geotextile-based structure installed in a bank of a waterway, such as a river. A: section view. B: isometric view. C: alternate stacking of group of geotextile-based structures, section view. D: single geotextile-based structure, section view.

FIG. 5 illustrates one exemplary geotextile-based structure in a retaining wall application. A: section view. B: isometric view.

DETAILED DESCRIPTION OF EXEMPLARY EMBODIMENTS

The present application relates to a geotextile-based structure for vegetative growth enhancement and erosion resistance. The structure can be advantageously used to prevent erosions of waterways and other areas subject to wearing away as it is not only effective and durable, but also straightforward and inexpensive to make, transport, and assemble. In addition, once plant growth has been established, the geotextile-based structure provides attractive, natural-looking scenery.

The geotextile-based structure includes a cage having a hollow interior lined with a geotextile fabric designed to retain fine particles where at least one section of the cage is attached to a geotextile mat capable of supporting vegetation.

The contemplated cage includes a mesh, a frame, a perforated sheet, a grid, or mixtures thereof. The cage has open holes which are of the shapes including round, oval, square, triangular, rectangular, irregular, or mixtures thereof. The size of the holes of the cage is large enough so that water can flow through easily without pressure. In one embodiment, the size of the holes is about 1 inch in diameter.

In another embodiment, there is an additional support for the geotextile mat. The additional support is a grid, or a supporting mesh or a mixture thereof that is attached to the geotextile mat. The geotextile mat or the supporting mesh or grid or all are attached to the cage. In another embodiment, the supporting mesh or grid are biodegradable.

The cage is made of metal, plastic, fiberglass, stone, clay, cement, or mixtures thereof. In one embodiment, the cage metal is stainless steel, galvanized steel, powdered-coated steel, polymeric-coated steel, polyvinylchloride-coated steel, or mixtures thereof.

The cage has a structured shape or a free-form shape. The shape resembles a cube, a cuboid, a sphere, an ellipse, a pyramid, a cylinder, a cone, a cuboid, a tetrahedron, or a rectangular prism. One embodiment of the cage has at least one open side. Another embodiment of the cage has an open top side. Yet another embodiment of the cage has an open top side and a closed bottom side. Still another embodiment of the cage has a closed top and a closed bottom side, both attached to four closed upright sides. A further embodiment is the cage having an open top and bottom sides with the other sides closed.

The geotextile-based structure can be used as a single unit or as a group of units, which are attached to each other or not. The attachment can be in series or at random so that many different geometries are possible depending upon the particular eroding surface at hand.

The cage is rigid, collapsible, or has features that allow it to be compressed. These features include being made from flexible materials, or having movable joints, clips, hinges, ties, hooks, rings, levers, fasteners, or mixtures thereof.

The cage includes a geotextile fabric liner designed to retain fine particles. The fabric liner is porous enough to allow water to flow through but not so porous as to allow fine particles to flow through. The geotextile fabric is made from a durable material that includes natural materials, synthetic materials, or mixtures thereof. In one embodiment, the geotextile fabric is a synthetic polymer chosen from the group of polyethylene, polyester, polypropylene, polyphenylene oxide, fluoropolymers, nylon, acrylic, polyurethane, polyamide, copolymers thereof, or mixtures thereof.

In order to provide stability, the cage is weighted or attached by anchoring means to the ground or is both weighted and attached to the ground. The cage is filled with a dense, heavy material such as sand, rocks, cement, or mixtures thereof. The cage can be filled with multiple different layers of materials. The cage, once filled, is load bearing and provides mechanical support to an erodible surface or structure.

It is contemplated that at least one section of the cage is covered by the geotextile mat. Not only does this arrangement provide protection of the cage, it also promotes stability and beauty of the structure due to plant attachment and growth. The exterior surface of the cage is covered by the geotextile mat, the interior surface of the cage is covered by the geotextile mat, or both surfaces are covered, at least in part, by the geotextile mat. In one embodiment, the top surface is covered by the geotextile mat. In another embodiment, a side surface is covered by the geotextile mat. In still another embodiment, the top exterior surface and at least one other exterior surface, such as a side exterior surface, is covered by the geotextile mat. In yet another embodiment, the entire exterior surface is covered by the geotextile mat.

The geotextile mat can be attached to the cage in separate pieces of geotextile mat or in a continuous sheet.

The geotextile mat is attached to the cage by any convenient means, such as by sewing, staples, adhesive, heat-bonding, rings, or mixtures thereof.

It is contemplated that the geotextile mat capable of supporting vegetation is a three-dimensional mat, which is woven or non-woven. The three-dimensional mat has a cuspated profile, a pyramidal shape, or a mixture thereof. This features provides additional shear resistance to the geotextile-based structure.

The three-dimensional mat is made from a thermoplastic filament yarn, which has a trilobal shape, a round shape, or mixtures thereof. Exemplary thermoplastic filament yarn polymers include polyester, polyethylene, polypropylene, polyphenylene oxide, fluoropolymers, nylon, acrylic, polyurethane, polyamide, copolymers thereof, or mixtures thereof. The denier of the thermoplastic filament yarn ranges from about 1200 to about 2000.

In one embodiment, the geotextile mat comprises a thickness in the range of about 0.25 inches (250 mils) to about 0.5 inches (500 mils). The geotextile mat is very durable having a tensile strength of at least about 2000 pounds/foot in the warp direction and at least about 1800 pounds/foot in the filling direction.

The geotextile-based structure further includes a vegetative-sustaining material. The vegetative-sustaining material is soil, mulch, compost, hydroseeding, sand, fertilizer, or mixtures thereof. The vegetative-sustaining material lies within a pocket formed between the geotextile mat and at least one section of a surface of the cage or the geotextile fabric. In an alternate embodiment, the vegetative-sustaining material is a material that is applied to the geotextile mat. In another embodiment, vegetative-sustaining material is contained within a separate packet that is attached to or placed within the cage or both.

In another embodiment, the geotextile-based structure is pre-seeded with plants, hydro-seeded, or live plants are attached thereto or combinations thereof are done before or after attachment of the mat to the geotextile-based structure. Irrigation lines or other means for fertilizing or watering can also be attached to the geotextile-based structure.

The geotextile-based structure described herein has many embodiments, one of which being a structure for soil stabilization comprising a metallic cage having an open top side, a closed bottom side attached to four upright sides, and having a hollow interior lined with a geotextile fabric designed to retain fine particles, wherein one upright side of the cage and the open top side of the cage are attached to and covered by a geotextile mat capable of supporting vegetation, wherein the geotextile mat comprises a three-dimensional, cuspated profile, woven mat comprising a trilobal thermoplastic filament yarn, and wherein a vegetative-sustaining material lies within a pocket formed between the geotextile mat and at least one side of the cage. Other embodiments are shown in the Figures below.

Referring now to FIG. 1, this Figure illustrates one exemplary geotextile-based structure, 10 for vegetative growth-enhancement and erosion resistance.

The exemplary geotextile-based structure, 10, shown in FIG. 1 A, is comprised of a four-sided cuboid cage 14 having an open top side and a closed bottom side and a hollow interior 12. The four sides of the cage 14 are attached to one another and the bottom side by hog ring fasteners 22. The cage 14 is lined on the interior by a geotextile fabric 16, which is attached by staples 24. The outer surface of the cage 14 is attached to a geotextile mat 18 on one side. The geotextile mat 18 is not flush with the surface of the cage 14 and is slightly longer than the side of the cage 14 it covers, so that the geotextile mat 18 forms a pocket 20 with the cage. In this Figure, five geotextile-based structures are linked together in series as a block. FIG. 1 B is the same geotextile-based structure 10 but giving the isometric view, where the geotextile mat 18 is shown as already attached to one side and a second portion of the mat 18, shown as a flap 26, which can be used to cover the top portion of the cage 14 after the cage interior is filled with heavy materials, such as rocks or sand. The anchoring means 28 can attach the cage to the ground. FIG. 1 C is the same geotextile-based structure 10 but giving the elevation view. FIG. 1 D is the same geotextile-based structure 10 but giving an enlarged plan view.

Figure 1A:
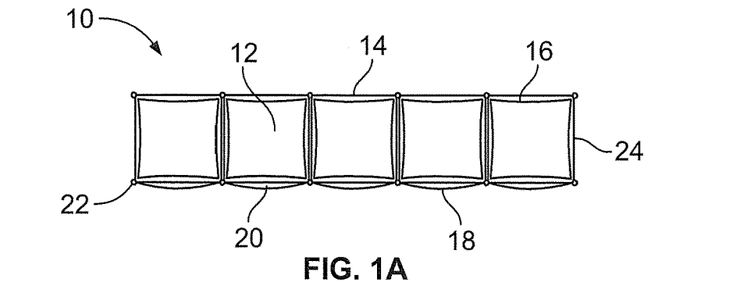
Figure 1B:
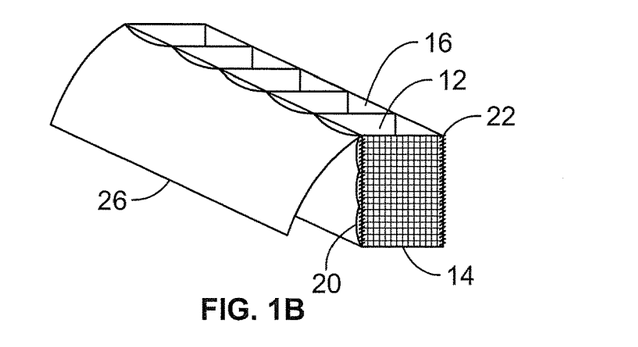
Figure 1C:
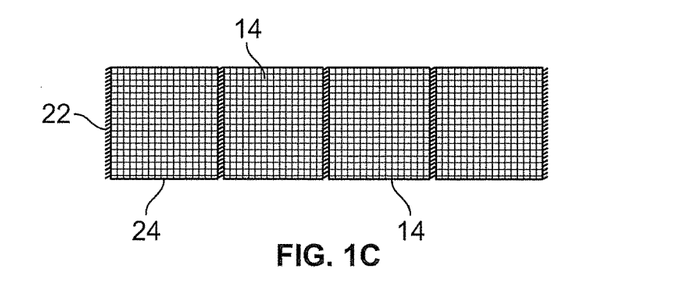
Figure 1D:
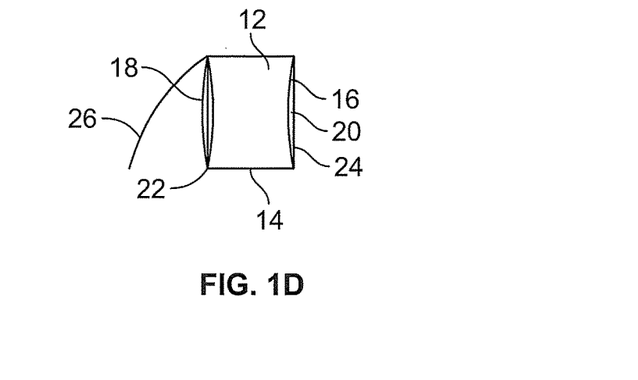
Figure 2:
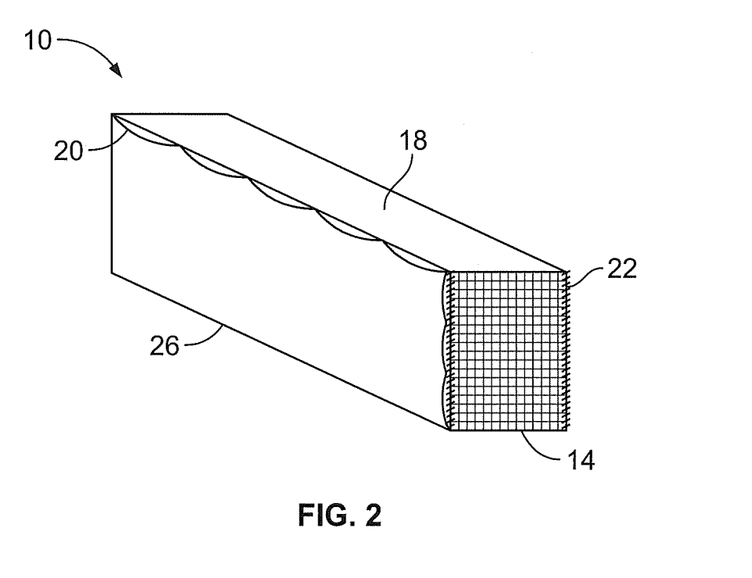
FIG. 2 illustrates one exemplary geotextile-based structure similar to FIG. 1 but shows the geotextile fabric covering the top of the open cage from an isometric view.

This exemplary grouping of a geotextile-based structure 10, shown in FIG. 2, is the same geotextile-based structure 10 of FIG. 1, but showing the geotextile mat's flap 26 attached to the top of the cage 14.

Figure 3:
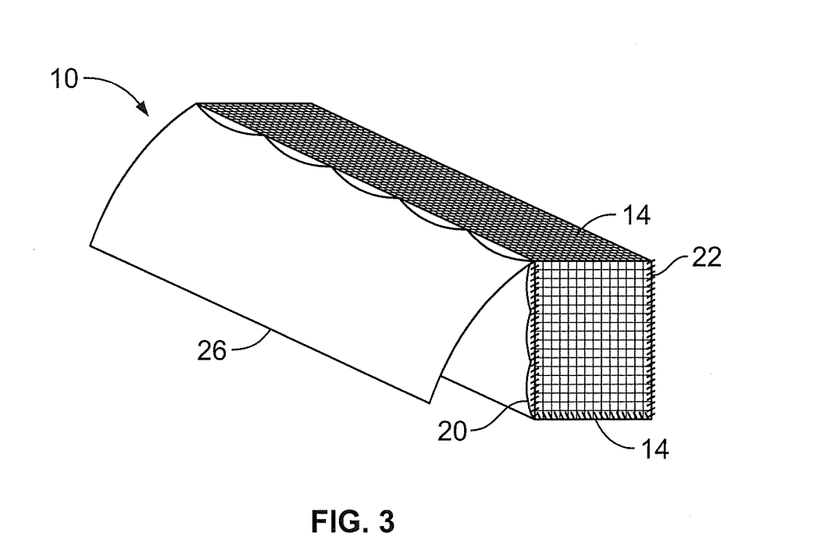
FIG. 3 illustrates one exemplary geotextile-based structure similar to FIG. 1 but includes a closed top side of the cage, which is coverable with the attached geotextile mat flap, shown from an isometric view.
Figure 4A:
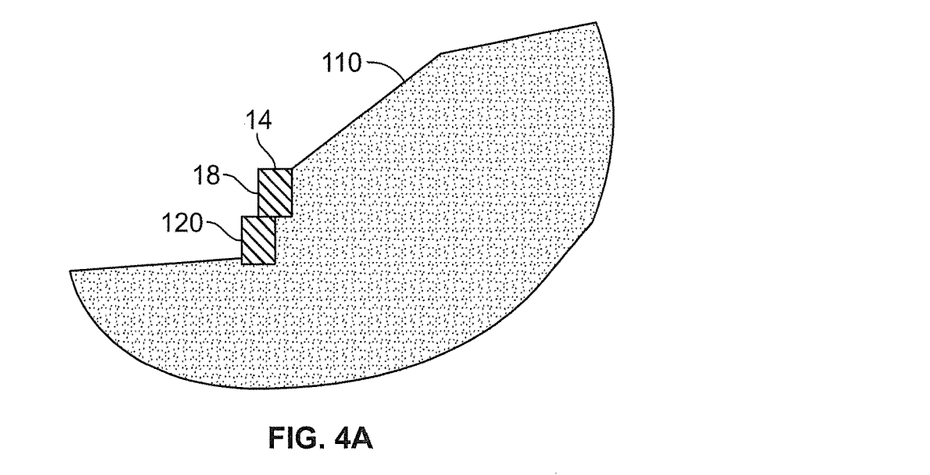
Figure 4B:
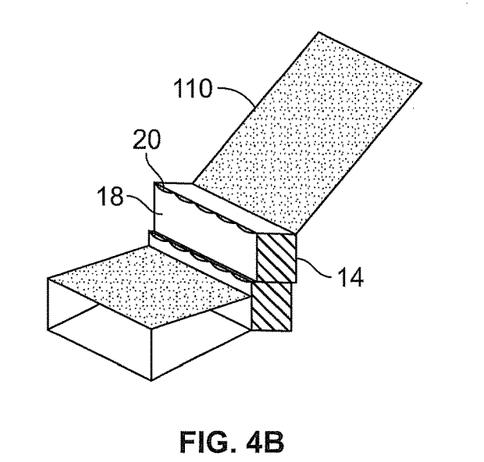
Figure 4C:
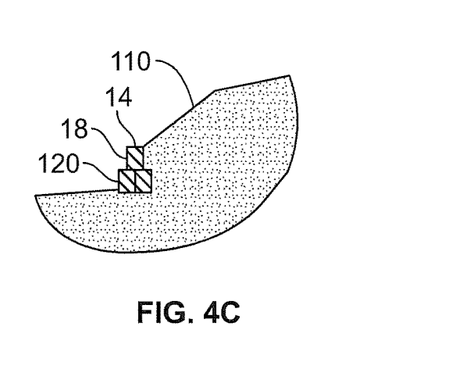
Figure 4D:
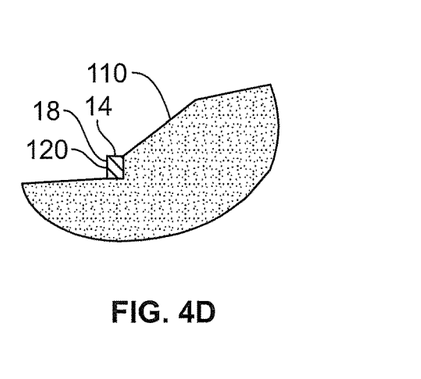

This exemplary grouping of a geotextile-based structure, 10, shown if FIG. 3, is the same geotextile-based structure 10 as above in FIG. 1, but showing that the cage 14 has a covered top side. The geotextile mat's flap 26 can be used over the top side of the cage 14.

In FIG. 4, a different exemplary grouping of two geotextile-based structures 10 is shown in an application such as a stream, pond, or canal bank 110. In FIG. 4 A, one geotextile-based structure is stacked vertically on top of another geotextile-based structure so as to vertically support the earthen slope of the bank 110 where the bank meets the water level 120. Here the lowest grade geotextile-based structure is submerged half-way underwater acting as a base to support the next geotextile-based structure, which is placed directly on top in a stair-like fashion. This arrangement prevents erosion of the bank because the moving water does not directly contact or disturb the soil of the bank but instead directly contacts the geotextile-based structure 10.

FIG. 4 B is the same geotextile-based structure but the isometric view. FIG. 4 C shows an alternate configuration than FIG. 4 A, where the lowest grade geotextile-based structure has a wider base than the second geotextile-based structure, which is placed on top. FIG. 4 D shows an alternate configuration than FIG. 4 A, where there is only one geotextile-based structure installed to support the river bank.

In FIG. 4, a different exemplary grouping of two geotextile-based structures 10 is shown in an application such as a stream, pond, or canal bank 110.

Figure 5A:
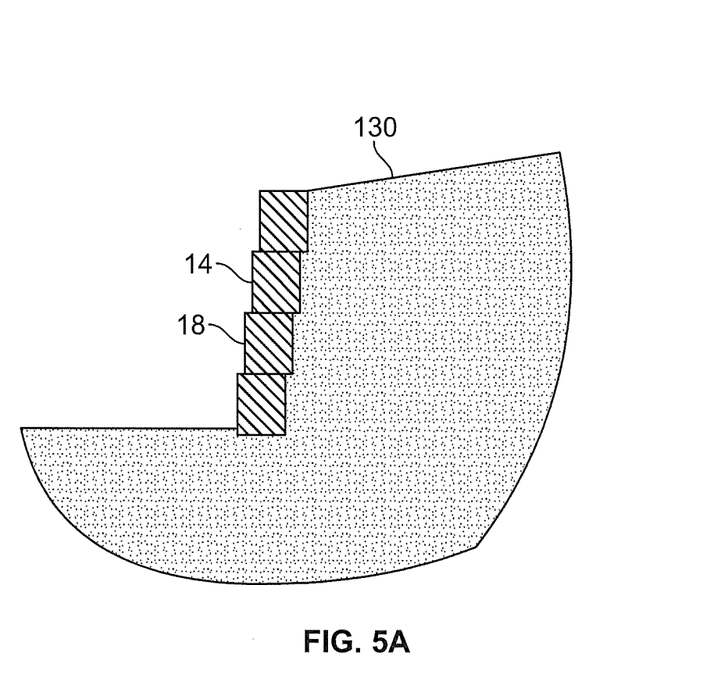
Figure 5B:
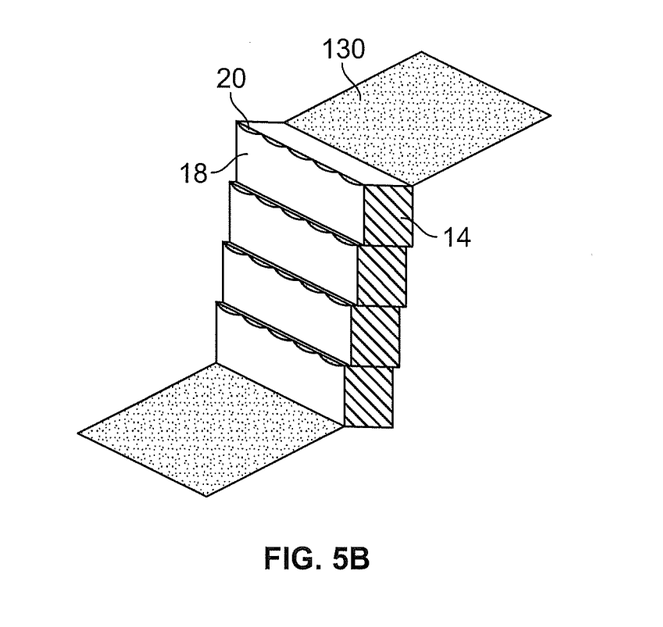

FIG. 5 A illustrates a different exemplary grouping of four geotextile-based structures 10, shown in an application, such as a retaining wall 130. Here the lowest grade geotextile-based structure is placed slightly below grade at the base of a cliff and three other geotextile-based structures are vertically stacked in a slightly offset manner to hold the soil of the cliff in place. FIG. 5 B is an isometric view of the arrangement.

Figure 6:
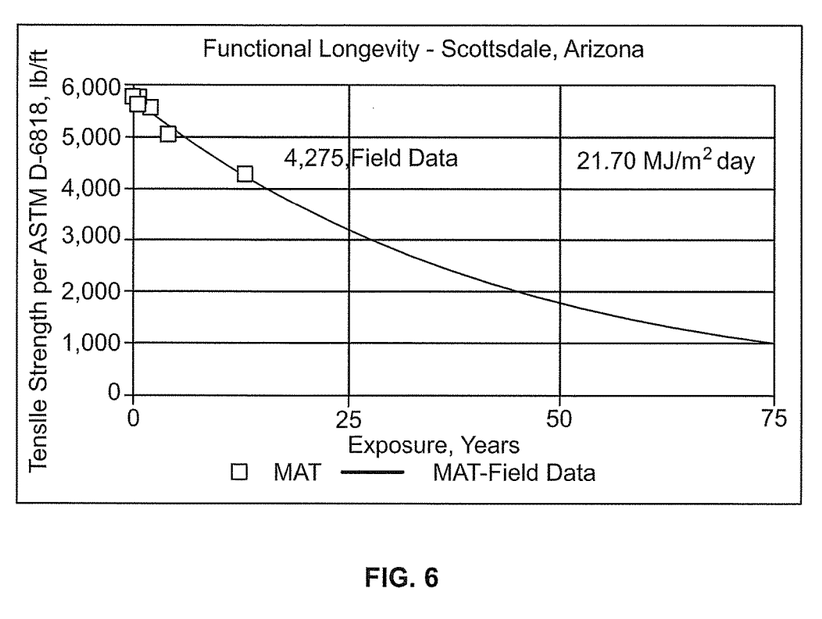
FIG. 6 is a graph showing the longevity of the geotextile mat.

FIG. 6 is a graph showing the longevity of the geotextile mat. The data projections are that the mat will still have 75% of its tensile strength after about 15 years, and about 50% of its tensile strength after 25 years.

Example 1

A series of performance tests were done to demonstrate efficacy of the geotextile mats described herein. Sample A was a pyramidal nonwoven mat having round monofilament fibers. Sample B was a pyramidal woven mat having trilobal monofilament fibers. The control was uncovered soil having no mat. Tests results are shown in the following Tables. Tensile strength was reported in Table 1. Germination testing was reported in Table II and Bench-Scale shear testing was reported in Table III. Shear stress was reported in Table IV. UV resistance was measured according to ASTM D-4355 and is reported in Table V. Functional Longevity is shown in FIG. 6.

Tensile strength was measured according to ASTM D 6818 and resiliency testing was conducted according to ASTM D 6524, as reported in Table 1.

TABLE I

Comparative Evaluation of Pyramidal Fibers

| Property | Me | Units | Current Specification MARV[a] | Sample A | Sample B | % difference of Std Data |
|---|---|---|---|---|---|---|
| Thickness | M D | mils | 500 | 409 | 393 | −4% |
| Mass per unit area | M D | Oz/yd$^2$ | 14 | 15.11 | 13.69 | −9% |
| Resiliency | M D | % change | −20 | −7.1 | −11.3 | 59% |
| Flexibility | M D | mg-cm | N/A | 726532 | 610969 | −16% |
| Tensile Strength-MD | M D | lb/ft | 3200 | 4752 | 4560 | −4% |
| Tensile Strength-XMD | | lb/ft | 2200 | 3192 | 3468 | 9% |
| Tensile Elongation-MD | M D | % | 65 (MAX) | 42 | 50.7 | 21% |
| Tensile Elongation-XMD | | % | 65 (MAX) | 38.7 | 36 | −7% |
| Light Penetration | M D | % | 25 | 13.5 | 6.6 | −51% |
| Ground Cover | | % | 75 | 86.5 | 93.4 | 8% |

[a]Minimum average roll value

As can be seen in Table 1, the geotextile mat made from trilobal fibers Sample B, has more favorable attributes than the geotextile mat made from round fibers, and is thus better suited for use in soil erosion prevention structures. For example, the resiliency of Sample B is higher than that of Sample A and shows that Sample B performs better at resisting short-term, repeated compression loadings. This means that the newly vegetated seeds would be better protected from damage during loading in Sample B, the trilobal mat.

Another important feature is the increased flexibility of Sample B over Sample A. The lower value for flexibility in the Table 1 indicates a more flexible product, which has an increased ability to conform to the surface upon which it is placed, thereby having more intimate contact. Sample B, the trilobal mat, performs better here too.

In addition, for Sample B the tensile strength is higher than that of Sample A. This increased tensile strength provides more resistance to stresses on the mat. Also, the tensile elongation is higher.

Table 1 likewise shows that the light penetration is less for Sample B (lower values indicate a denser configuration) than Sample A. Light penetration is a function of the percent open area of a mat with denser mats better able to trap and contain fine particles. This is especially critical when vegetation is absent or newly established and where root mass provides little or no contribution to the containment. Thus, the testing of Table 1 shows the trilobal mat is more durable and better able to support plant growth.

The second test measured the amount of vegetative growth on the geotextile mat. The test procedure followed was that developed by the Erosion Control Technology Council (ECTC) designated as the "Standard Index Test Method for Determination of Temporary Degradable Rolled Erosion Control Product Performance in Encouraging Seed Germination and Plant Growth."

TABLE II

Germination Testing

| Property | Units | day | control | Fabric A | Fabric B | % difference to Std Data |
|---|---|---|---|---|---|---|
| Seeds Germinated per area | # per 4 in² area | 0 | 0 | 0 | 0 | n/a |
| | | 7 | 0 | 0 | 0 | n/a |
| | | 14 | 2.6 | 0 | 4.4 | n/a |
| | | 21 | 8.2 | 0.8 | 12.7 | 1488% |
| Average Plant Height | inch | 0 | 0 | 0 | 0 | n/a |
| | | 7 | 0 | 0 | 0 | n/a |
| | | 14 | 1.4 | 0 | 1.4 | n/a |
| | | 21 | 1.6 | 1 | 1.5 | 50% |
| Plant mass per area | mg per 4 in² | 21 | 3.9 | 1 | 8.6 | 760% |

The data shows that after 21 days, Sample B, which is the geotextile mat of the present application having a trilobal monofilament yarn, had a 1488% improvement in seed germination per unit area as compared to Sample A, a similar mat made with a round monofilament yarn. This superior result is unexpected and surprising given the only major difference is the shape of the yarn.

Likewise, the average plant height was surprisingly improved for Sample B. The improvement of Sample B over Sample A was 50%.

In addition, the plant mass area was surprisingly improved too, with the improvement of Sample B over Sample A being 760%. Thus the geotextile mat having trilobal yarns is tremendously better for seed germination and plant growth as compared to other similar mats. These benefits are especially helpful in erosion control structures where the plants and the roots provide additional stabilization to the structure.

The third test was that of shear testing. Bench-Scale shear testing employs the following apparatus and procedures. Pots having an 8 inch diameter, a 4 inch depth, and containing soil were immersed in water and the surface was subjected to shear stresses caused by the rotation of an impeller for 30 minutes. The shear stress test apparatus included a tank, an internal table to hold recessed pots, and the impeller.

The impeller was mounted so that the blades were slightly above the surface of the pots. The internal table had openings that hold the pots of soil. When the pots were placed in the table opening, the test surface was flush with the top of the table. The amount of soil that eroded was found from weighing the containers of saturated soil both before and after testing. Tests were run at three shear stress levels. From this data, the shear stress associated with a critical amount of soil loss was calculated. Shear (X=lb/ft2) was calculated using the following formula: $x = y * \hat{y} * 2f$ where unit weight of water (lb/ft3)=y; flow depth (ft)=$\hat{y}$; angle of energy grade line (degrees)=2f.

TABLE III

Bench-Scale Shear Testing

| psf | Fabric A | Fabric B | % difference to Std Data |
|---|---|---|---|
| 3.87 | 413 | 288 | −30% |
| 4.72 | 590 | 370 | −37% |
| 5.57 | 683 | 432 | −37% |

In Table III, the water flow is designated as pounds per square foot (psf) in the first column. Soil lost by washing, measured in grams, is listed for Samples A and B in the next two columns. By interpolation from the lab scale testing, a loss of 450 grams of soil is equivalent to one-half inch in the field and is unacceptable. The results of Table III indicate that Sample B had 30% less soil loss than Sample A at 3.87 psf and 4.72 psf and 37% less soil loss than Sample A at 5.57 psf. Under no test condition here did Sample B lose less than 450 grams of soil. Therefore, soil erosion can be reduced by at least 30% by using the geotextile fabrics presently described as compared to those using round monofilaments. These results are unexpected and surprising in light of the similarity of Sample A.

Pyramidal fabric of the present application (Sample B) was also evaluated against Sample A in shear stress and velocity tests, as reported in Table IV. The test method followed was also from the ECTC and was entitled "Standard Index Test Method for Determination of Unvegetated Rolled Erosion Control Product Ability to Protect Soil from Hydraulically-Induced Shear Stresses Under Bench-Scale Conditions."

TABLE IV

Pyramidal Fabric Tested with Standard Kentucky Bluegrass Vegetation

| | Unit of Measure | Traditional Round | Multi-Lobe | Performance Improvement of |
|---|---|---|---|---|
| Shear Stress | LB/ft² | 10.1 | 13.3 | 32% |
| Velocity | Ft./sec. | 15 | 17.9 | 19% |

| | Unit of Measure | Traditional Round | Multi-Lobe | Decrease Growing Time |
|---|---|---|---|---|
| Planted | | June 1999 | June 2004 | |
| Tested | | June 2000 | Mid-Sept. 2004 | |
| Duration | Months | 12 | 3.5 | −71% |

With reference to Table IV, it can be seen that shear stress and velocity were both improved for the pyramidal fabrics of the present application. Additionally, growing time was decreased significantly by the use of the pyramidal fabrics of the present invention. Growing times decreased by at least 50% as compared to pyramidal fabrics made from round monofilament yarn.

Example 2

The tensile strength and UV resistance of the geotextile mat used in the geotextile-based structure is shown in Table 5. The mat was subjected to physical and mechanical property testing as well as UV resistance testing for exposures of 500 hours, 1000 hours, 3000 hours, and 6000 hours according to the ASTM methods listed in the Table.

TABLE V

Independent Test Results vs. Published Values

| Property | Units | Test Method | Test Average | Published Value[1] |
|---|---|---|---|---|
| Tensile Strength - MD | lb/ft | ASTM D-6818 | 5,760 | 4,000 |
| Tensile Strength - TD | lb/ft | ASTM D-6818 | 3,708 | 3,000 |
| Elongation - MD | % | ASTM D-6818 | 56 | 40 |
| Elongation - TD | % | ASTM D-6818 | 41 | 35 |
| Thickness | in | ASTM D-6525 | 0.61 | 0.40 |
| Resiliency | % | ASTM D-6524 | 87 | 80 |
| Mass/Unit Area | oz/yd$^2$ | ASTM D-6566 | 13.9 | 13.5 |
| Light Penetration | % | ASTM D-6567 | 8 | 10 |
| Flexural Rigidity | mg-cm | ASTM D-6575 | 1,192,189 | 616,154 |
| UV Resistance at 500 Hours | % | ASTM D-4355 | 98% | — |
| UV Resistance at 1,000 Hours | % | ASTM D-4355 | 99% | — |
| UV Resistance at 3,000 Hours | % | ASTM D-4355 | 96% | — |
| UV Resistance at 6,000 Hours | % | ASTM D-4355 | 90%[2] | 90% |
| UV Resistance at 10,000 Hours | % | ASTM D-4355 | — | 85% |

Notes:
[1]All values have been obtained from published literature.
[2]While current third- party testing shows a result of 87%, an average of third party and internal GAI-LAP Accredited Testing shows a result of 90%.

The results demonstrate that the present geotextile mat has 90% UV resistance at 6000 hours, which is very stable and increases the durability of the mat. Many government agencies require a UV resistance of 80% at 3000 hours so the present mat exceeds government requirements. These results show that the geotextile mat has a very long life and will not need replacement for years, which is a substantial economic benefit.

Example 3

In order to determine the functional longevity of the geotextile mat, the UV stability can be correlated with the field performance. After the tensile strength of the mat is measured, a correlation can be made in order to establish an acceleration factor, which serves to adjust lab test results for UV stability with actual conditions in use.

Samples of the geotextile mat were taken from the Bell Road Channel in Scottsdale, Ariz., where local solar radiation is 21.70 MJ/m$^2$ per day, to determine the retained tensile strength of the mat after 13 years of exposure. The data shown in FIG. 6 indicated an average retained tensile strength of 4275 lb/ft and an acceleration factor of 4.9. The longevity of the geotextile mat over time is illustrated in FIG. 6. This test again indicates that the geotextile mat is very durable and has a long life span.

Example 4

Vegetation is another form of erosion control. The combination of the vegetation's average root length and average root volume established in the soil below a geotextile mat has an impact on hydraulic performance. Testing was performed according to ASTM D6460 procedures. Table VI shows the full scale test results from two types of woven geotextile mats, one having 25 year UV stability and the other having 75 year UV stability, both made with trilobal fibers and being pyramidal. The results show that when the mats are increasingly vegetated, there is more shear stress and the amount of soil erosion is also lessened.

TABLE VI

| Product | Vegetation Condition | Soil Type | Soil Loss | Shear Stress psf (Pa) |
|---|---|---|---|---|
| Trilobal Mat 25 yr, UV Resistance | 90% Vegetated | Loam | <0.5 | 12.00 (574.16) |
| Trilobal Mat 75 yr, UV Resistance | 30% Vegetated | Loam | <0.5 | 8.00 (382.78) |
| | 70% | Loam | <0.5 | 12.00 (574.16) |
| | 90% | Loam | <0.5 | 16.00 (765.55) |

Example 5

Another test that was done includes Wave Topping, which simulates the hydraulic forces seen when a levee or berm is overtopped by waves or storm surge. The Wave Topping Test examined wave overtopping resiliency of Bermuda sod reinforced with a trilobal fiber, pyramidal woven geotextile mat as described herein. The Bermuda sod was in excellent condition prior to testing. The test consists of intermittent overflow of water that is characterized as highly turbulent, super-critical, and unsteady in both time and down-slope distance. Peak flow velocities of such a test can be several times greater than velocities of steady overflow having the same average discharge. Full-scale levees are simulated by "planter boxes" or trays that are especially prepared to mimic the geometry and vegetated surfaces of typical levees. The trays contained clay soil, the geotextile mat on top of that, and overlying that the Bermuda sod. The tested geometry is constructed using two steel trays where the upper portion of the levee slope is represented by a straight tray having a length of 20 feet. The tray for the lower portion of the levee has a bend with 8 feet of the length oriented on a 3H:1V slope and 12 feet oriented on a 25H:1V slope. Both planter trays making up a "set" have a width of 6 feet and depth of 12 inches. The test consist of discharging water from the reservoir at a rate of 2.0 ft3/s per ft. (cfs/ft.) for the first hour, 3.0 cfs/ft. for the second hour, and 4.0 cfs/f for the third hour. During the successive tests, the stability of the trays is monitored and their soil loss is measured. The effectiveness of the mat is determined by the material's ability to retain the underlying soil throughout the testing simulation.

The overtopping test simulated incident wave conditions having a significant wave height of 8.0 feet with a peak spectral wave period of 9 s. Three identical tests were run in a wave overtopping simulator and each segment was equivalent to 1 hour of overtopping in nature with an average overtopping discharge of 4.0 cfs/ft.

Generally, the Bermuda grass reinforced with the trilobal fiber, pyramidal woven geotextile mat performed very well. Above the mat, the material around the grass crowns was eroded away by the swift water flows and at a few locations, the mat was exposed when the overlying material was removed. Soil loss beneath the mat did not occur over most of the tested slope. At the one location where the mat was exposed, the total loss included the cover layer over the mat (between 0.75 and 1.25 inches) and less than 1 inch of soil loss beneath the mat. Furthermore, the soil loss beneath the mat was confined to a relatively small area at the transition between the slopes. The overall integrity of the geotextile mat system was judged to be very good for these extreme hydraulic loading conditions Alternative embodiments of the subject matter of this application will become apparent to one of ordinary skill in the art to which the present invention pertains without departing from its spirit and scope. It is to be understood that no limitation with respect to specific embodiments shown here is intended or inferred.

We claim:

1. A geotextile-based structure for soil stabilization comprising a cage having a hollow interior lined with a geotextile fabric designed to retain fine particles wherein at least one section of the cage is covered by a geotextile mat capable of supporting live vegetation and wherein a pocket is formed between the geotextile mat capable of supporting live vegetation and at least one section of the cage.

2. The geotextile-based structure of claim 1 wherein the geotextile mat capable of supporting vegetation comprises a three-dimensional mat comprising a thermoplastic filament yarn.

3. The geotextile-based structure of claim 1 wherein the geotextile mat capable of supporting vegetation comprises a three-dimensional, cuspated profile, woven mat comprising a trilobal thermoplastic filament yarn.

4. The geotextile-based structure of claim 1 further comprising a vegetative-sustaining material.

5. The geotextile-based structure of claim 4 wherein the vegetative-sustaining material comprises soil, mulch, hydroseeding, sand, or mixtures thereof.

6. The geotextile-based structure of claim 4 wherein the vegetative-sustaining material lies within the pocket formed between the geotextile mat capable of supporting live vegetation and at least one section of the cage.

7. The geotextile-based structure of claim 1 wherein the cage comprises a mesh, a frame, a perforated sheet, a grid, or mixtures thereof.

8. The geotextile-based structure of claim 1 wherein the cage comprises metal, plastic, fiberglass, stone, clay, cement, or mixtures thereof.

9. The geotextile-based structure of claim 8 wherein the metal comprises stainless steel, galvanized steel, powdered-coated steel, polymeric-coated steel, polyvinylchloride-coated steel, or mixtures thereof.

10. The geotextile-based structure of claim 1 wherein the geotextile mat capable of supporting live vegetation covers at least one outer surface of the cage.

11. The geotextile-based structure of claim 1 wherein the cage is weighted for stability.

12. The geotextile-based structure of claim 1 wherein the cage comprises a metallic cage having an open top side and a closed bottom side attached to four upright sides.

13. The geotextile-based structure of claim 1 wherein the cage is collapsible.

14. The geotextile-based structure of claim 2 wherein the geotextile mat comprises a thermoplastic filament yarn polymer comprising polyester, polyethylene, polypropylene, polyphenylene oxide, fluoropolymers, nylon, acrylic, polyurethane, polyamide, copolymers thereof, or mixtures thereof.

15. The geotextile-based structure of claim 1 wherein the geotextile mat comprises a thickness in a range of about 0.25 inches (250 mils) to about 0.5 inches (500 mils).

16. The geotextile-based structure of claim 1 wherein the geotextile mat comprises a tensile strength of at least about 2000 pounds/foot in the warp direction and at least about 1800 pounds/foot in the filling direction.

17. The geotextile-based structure of claim 2 wherein the denier of the thermoplastic filament yarn ranges from about 1200 to about 2000.

18. The geotextile-based structure of claim 1 further comprising an anchoring means to attach the cage to the ground.

19. The geotextile-based structure of claim 1 further comprising a top side for the cage.

20. A geotextile-based structure for soil stabilization comprising a metallic cage having an open top side, a closed bottom side attached to four upright sides, and having a hollow interior lined with a geotextile fabric designed to retain fine particles, wherein one upright side of the cage and the open top side of the cage are attached to and covered by a geotextile mat capable of supporting live vegetation, wherein the geotextile mat comprises a three-dimensional, cuspated profile, woven mat comprising a trilobal thermoplastic filament yarn, and wherein a vegetative-sustaining material lies within a pocket formed between the geotextile mat and at least one side of the cage.

* * * * *